United States Patent
Jarvis

(10) Patent No.: US 6,273,288 B1
(45) Date of Patent: Aug. 14, 2001

(54) FOOD PAN AND COVER WITH INTERIOR HINGED LID

(75) Inventor: Charles W. Jarvis, Irvine, CA (US)

(73) Assignee: Cambro Manufacturing Company, Huntington Beach, CA (US)

( * ) Notice: Subject to any disclaimer, the term of this patent is extended or adjusted under 35 U.S.C. 154(b) by 0 days.

(21) Appl. No.: 09/300,942

(22) Filed: Apr. 28, 1999

(51) Int. Cl.[7] .............................. B65D 43/16; B65D 51/18
(52) U.S. Cl. .......................... 220/259; 206/545; 220/254; 220/366.1; 220/367.1; 220/832
(58) Field of Search .................................. 220/212, 212.5, 220/254, 259, 369, 831, 832, 840, 912, 810, 848, 523, 524, 525, 526, 819, 826, 367.1, 366.1, 592.28; 229/903, 904; 206/373, 545; 219/386, 387; 312/286; 126/373; 99/646 C; D7/354

(56) References Cited

U.S. PATENT DOCUMENTS

| | | | |
|---|---|---|---|
| Re. 33,231 | * | 6/1990 | Gallery, IV et al. ............... 220/831 |
| 1,002,333 | * | 9/1911 | Stollberg ........................... 220/254 X |
| 1,119,725 | * | 12/1914 | Ray ..................................... 220/826 |
| 1,485,602 | * | 3/1924 | Fleischer et al. ............. 220/367.1 X |
| 1,894,575 | * | 1/1933 | Sherman .............................. 220/254 |
| 2,047,461 | * | 7/1936 | Doyle ................................... 220/826 |
| 2,753,051 | * | 7/1956 | Tupper ............................. 220/259 X |
| 3,038,102 | * | 6/1962 | Singer ..................................... 99/403 |
| 3,130,288 | * | 4/1964 | Monaco et al. ................. 220/592.28 |
| 4,512,497 | * | 4/1985 | Grusin ................................... 220/369 |
| 4,759,478 | * | 7/1988 | Richardson et al. ................. 220/254 |
| 4,921,119 | * | 5/1990 | Goad et al. .......................... 220/212 |
| 5,002,197 | * | 3/1991 | Ponsi ..................................... 220/259 |
| 5,145,088 | * | 9/1992 | Goujon ................................. 220/335 |
| 5,337,911 | * | 8/1994 | Holub ................................... 220/254 |
| 5,529,205 | * | 6/1996 | Corney et al. ........................ 220/342 |
| 5,673,811 | * | 10/1997 | Dickinson et al. ................... 220/832 |
| 5,769,261 | * | 6/1998 | Gaffney et al. ...................... 220/831 |
| 6,065,462 | * | 5/2000 | Huang et al. ........................ 220/254 |
| 6,092,690 | * | 7/2000 | Bitowft et al. ....................... 220/831 |

* cited by examiner

Primary Examiner—Allan N. Shoap
Assistant Examiner—Joe Merek
(74) Attorney, Agent, or Firm—George F. Bethel

(57) ABSTRACT

A removable cover for a food pan which seats on upright side walls of the food pan and has an opening with a hinged lid mounted interiorly of the periphery of the cover for access to the pan. A peripheral flange on the cover seats over and downwardly on the edge of the pan with the cover having an upwardly extending flange surrounding at least in part the opening of the cover. A downwardly extending flange surrounds at least in part the periphery of the hinged lid for seating over the flange cover. A hinge stop on the cover stops the hinged lid when opened. A notch in the hinged lid provides placement of a serving utensil therein.

15 Claims, 3 Drawing Sheets

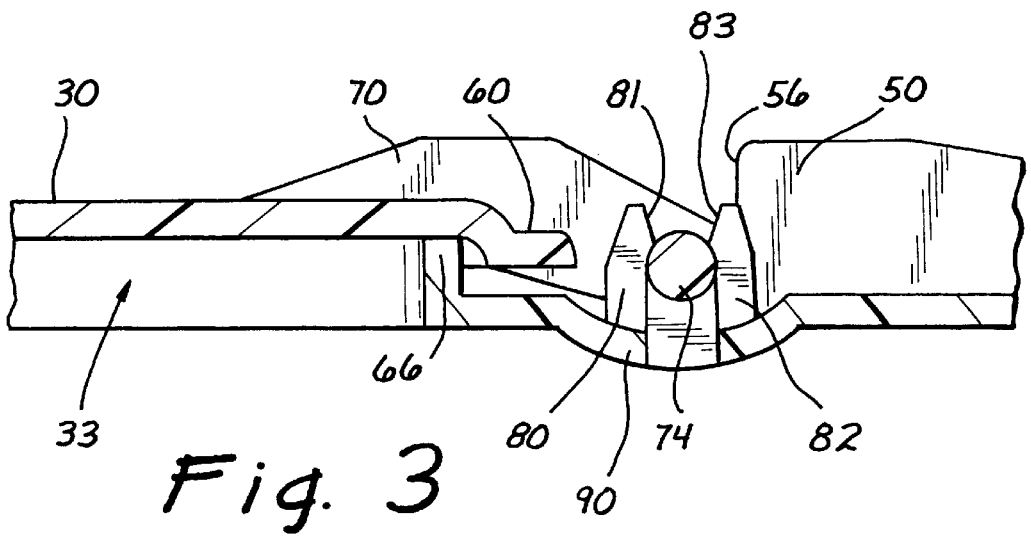
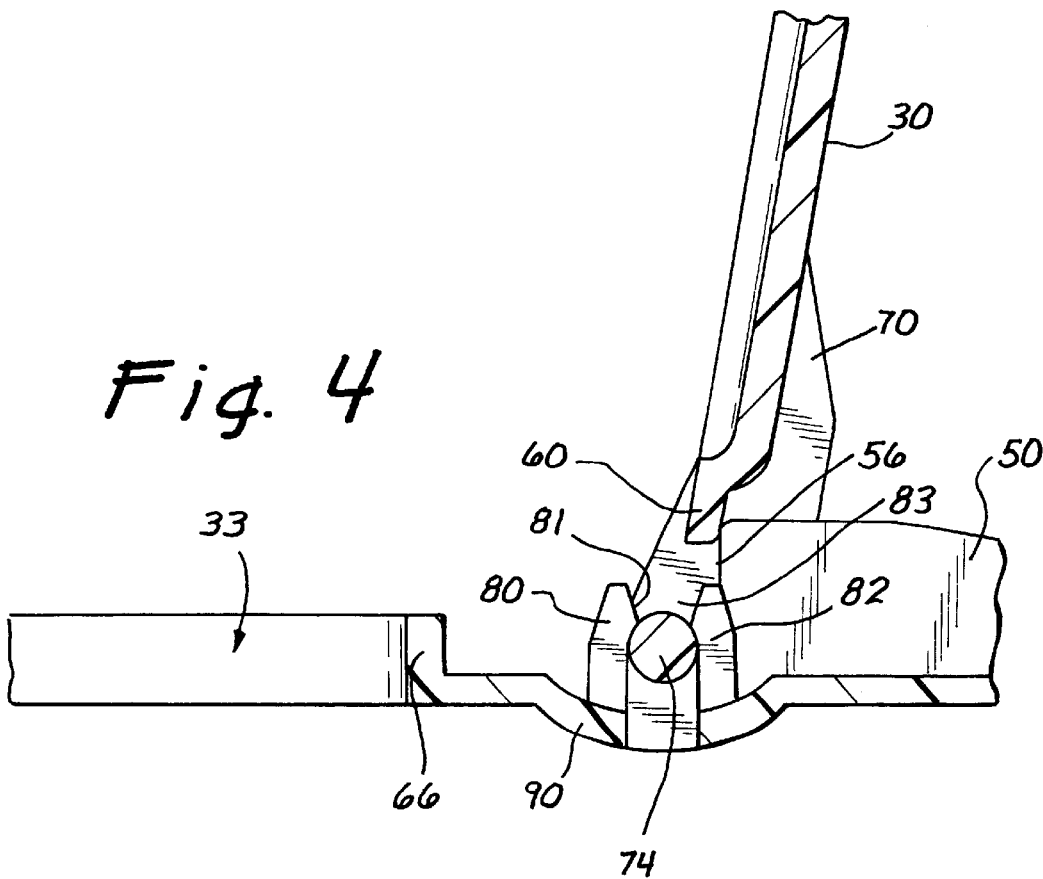
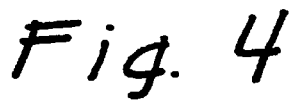

FOOD PAN AND COVER WITH INTERIOR HINGED LID

BACKGROUND OF THE INVENTION

1. Field of the Invention

The field of this invention resides within the food service art. The food service art includes pans with lids thereon for institutional food service which are well known in the art. Such pans with lids include those which are removable for food service in institutional environments in a heated, cooled, or ambient condition. More specifically, this invention relates to food service pans with lids that can be removed and in particular involves removable lid access to the interior of the food pan.

2. Prior Art

The prior art with regard to food service and particularly institutional food service has incorporated numerous pans, bins and containers for serving food. It is known to serve food in an institution including fast food service, schools, hospitals, as well as restaurants from open and closed containers. Some of these open and closed containers have hinged lids and in other cases lids that are lifted off.

It has been found in the prior art that a lid which lifts off is sometimes difficult to replace and becomes skewed when it is put back on the container. Further to this extent, it creates a nuisance to those passing through such a place as a salad bar to lift off the lid and then put it back on. In such cases, there have been lids that have been hinged backwardly but usually create a situation that is an obstruction to further food handling and service.

It has also been found that when foods are not maintained with a lid, they become dried out and cold or can be contaminated. Contamination is a very important consideration in food service as can be appreciated. Consequently, if ease of access can be maintained while at the same time a cover is emplaced over the food service pan or container, overall service and food protection as well as quality is enhanced.

The innovative food service lid and pan of this invention helps to keep food fresher. It makes food service operations safer as well as being more efficient.

The hinged lid on the food pan provides easy access and opening so that the food can be held without significant drying and deterioration. This serves to increase yields of food and provides for greater efficiencies.

Further to this extent, the food lid of this invention avoids complete removal of the lid and possible cross contamination of food. Some foods are known to have a much lesser shelf life when prepared and if lids are interchanged, it serves as a point of contamination.

The lid of this invention is flanged to protect against cross-contamination while at the same time allowing easy opening and access to the pan contents.

Further improvements allow for a serving utensil opening or notch in the corner. The notch allows a portion scoop, spoon, or other serving utensil to be held in the pan.

A further improvement is the fact that the lid can be tilted backwardly in the neighborhood of 94° for easy access. Also, it can be stacked with lids and pans in overall relationship.

The pan and cover are easily disassembled by merely lifting off the cover and removing it for purposes of cleaning. Furthermore the covers are easily interchanged with regard to various depth pans and food service containers.

From the foregoing, and the following description of the preferred embodiments, it will be appreciated that this invention is a significant step over the art.

SUMMARY OF THE INVENTION

In summation, this invention comprises a food service pan and cover with an interior openable lid on a hinge that allows for pivotal backward movement of the lid to a rest point and a protective flange for eliminating cross-contamination in order to keep food moist and appealing while yet at the same time allowing easy access to the contents of the pan.

More specifically, the invention comprises a combination pan for the holding of food items to be served and a cover thereover. The cover incorporates a flanged top portion which seats on the pan and helps to seal the pan.

Internal to the cover is a hinged portion forming an internal hinged lid. The internal hinged lid can be pivoted backwardly to a rest point allowing access.

The hinged lid specifically incorporates a protective flange extending downwardly in order to allow for protection of the contents through any light spillage of other foods or older food which helps to limit cross-contamination.

Further to this extent, the hinge has a pair of pivotal hinge elements incorporating a hinge pin which seats securely into a pair of expandable pins or clamps in a flange that extends around the top of the hinged portion.

The result is to provide for a hinged interior lid on a food service pan cover that provides for safer food service on a more efficient basis while at the same time increasing yields to limit food from becoming dried out and helping to avoid cross-contamination of food in various pans.

BRIEF DESCRIPTION OF THE DRAWINGS

FIG. 3 shows a sectional view of the hinge element and the flange at that portion in the direction of lines 3—3 of FIG. 1.

FIG. 4 shows the hinged lid in its backward orientation at approximately a 94° resting point against the hinge stops.

DETAILED DESCRIPTION OF THE PREFERRED EMBODIMENTS

Figure 1:
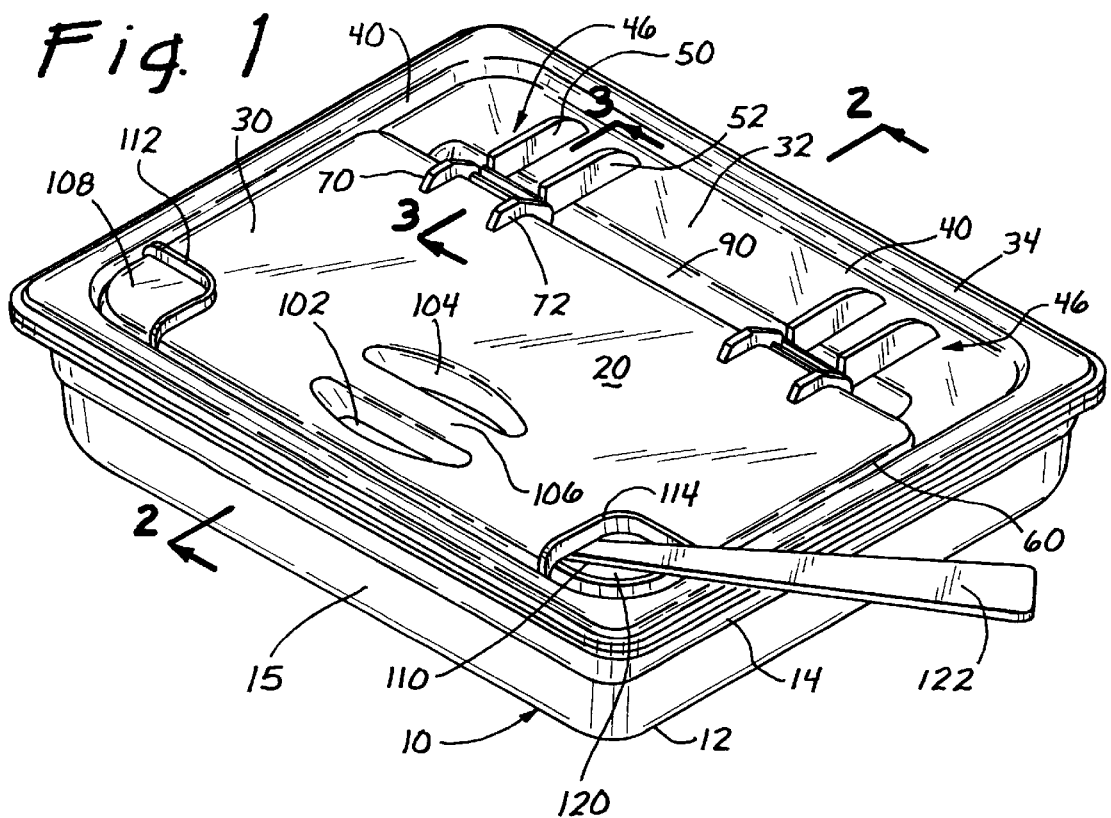
FIG. 1 shows a perspective view of the pan and cover of this invention with a food scoop or spoon inserted into a notched corner opening of the lid.

Looking specifically at FIG. 1 it can be seen that a pan, container, or receptacle 10 has been shown. The pan 10 has a bottom with rounded edges for easy removal of food. These rounded edges can be seen as edges 12 circumscribing the base of the pan.

The pan extends upwardly and includes a flanged offset 14 in side walls 15 circumscribing the pan. The flanged offset 14 in walls 15 allows for reinforcement by virtue of a small inset, ledge, or angular rib 16. The flanged offset 14 extends upwardly and terminates in a peripheral flange 18. The peripheral flange 18 receives the cover 20 which is detailed hereinafter as to the way it sits on the pan and its overall configuration.

The peripheral flange 18 of the pan 10 is shown having a recessed portion 22 and a dropped extending portion 24. This allows for receipt of the cover 20 in a relatively snug manner while at the same allowing for easy removal.

The cover 20 incorporates an interior portion 30 forming a hinged lid well as an exterior portion 32. The exterior portion defines an opening 33 overwhich the hinged lid is received as a cover. The respective interior portion and exterior portion allow for seating of the cover 20 on the pan 10 and permitting access by tilting back the interior portion or hinged lid 30 as shown in FIG. 4.

Surrounding the exterior portion 32 is a flange 34 which can be described as an outer flange that seats on the peripheral flange 18. The outer flange 34 is matched and indexed to the peripheral flange 18 and seats thereover in a snug manner. The cover's outer flange 34 has a like configuration incorporating a recessed portion 36 and a peripheral outer portion 38 that drops downwardly over the matching peripheral pan flange 18. This allows for seating when the interior of the outer flange 34 is emplaced thereover.

In order to enhance placement of the cover 20 onto the pan 10, an interior edge or wall 40 is shown surrounding the interior of the outer portion 32. This defines a recess or dropped space below the top surface of the flange 34 or edge of the cover 20.

In order to allow access into the interior of the pan 10, the lid 30 can be tilted backwardly as seen in FIG. 4. In order to do this, the lid 30 is hinged on a pair of identical lid hinges. These lid hinges are shown as lid hinges 46 that incorporate a pair of hinge stops 50 and 52. These stops 50 and 52 allow for movement of the hinged lid portion 30 thereagainst in the manner shown in FIG. 4 to provide access.

Figure 2:
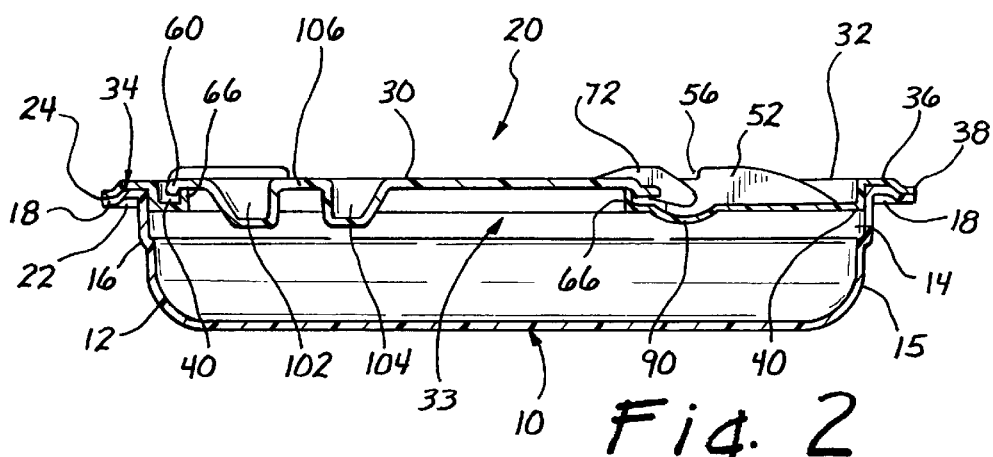
FIG. 2 shows a sectional view in the direction of lines 2—2 of FIG. 1.

The hinge stops 50 and 52 are notched with a notch 56 as can be seen in greater detail in FIGS. 3 and 4. This notch 56 allows an outer flange 60 of the hinged lid portion 30 to rest thereagainst. This flange can be seen as flange 60 shown in FIGS. 3 and 4 as well as in the less detailed showings of FIGS. 1 and 2. The flange 60 overlaps the depressed space or recess bounded by edge wall 40 which surrounds the interior of the major portion of the removable cover 32.

This outer flange 60 in cooperation with interior recess or space bounded by wall 40 and a flange 66 provides for the prevention of minor spills into the interior of the pan 10. In effect, it walls off the flow of fluid in some measure into the area interior to the pan 10.

The outer flange 60 of the pivotal lid portion 30 seats over the stop wall or upright flange 66 which surrounds the interior opening 33 of the major lid portion 32 where the hinged portion 30 overlays. This is particularly important in that it prevents the flow of fluid over the flange 60 into the interior of the pan 10. In effect the flange 66 and recessed portion surrounded by wall 40 serves as a sump to prevent ingress of foods and fluids into opening 33.

As previously mentioned a pair of hinges 46 are utilized with brackets 50 and 52 which includes the stop 56. The hinges 46 include hinge plates 70 and 72. These hinge plates 70 and 72 extend to the outside of the tabs or stops 52 while at the same time incorporating a hinge pin 74.

The hinge pin 74 is received within a pair of upright hinge clamps or pins 80 and 82. These hinge clamps 80 and 82 are sufficiently resilient to allow insertion of the hinge pin 74 therebetween by a snap fit receipt through the throat of the hinge clamps 80 and 82 along the beveled edges 81 and 83 thereof. The pins or clamps 80 and 82 have interior convex capture surfaces that overlie and hold the hinge pin 74 once it is snapped into place.

The hinge clamps 80 and 82 are formed within a trough 90 that is shown as a general lower elongated boss within the figures that allows for the hinge plates 70 and 72 with a curved end thereof to pivot backwardly and be received therein without interfering with the top surface of the major portion 32 of the cover 20.

In order to provide a hand hold or grip for tilting back the pivotal interior lid 30, a pair of hand grip, or finger grip notches 102 and 104 are provided. These grip notches 102 and 104 are provided with an interior web or raised surface 106 which allows for a grip to be provided by one's fingers. In this manner, the lid 30 can be lifted up and tilted backwardly as seen in the showing of FIG. 4.

The pivotal lid portion 30 also includes two corner areas 108 and 110. These areas 108 and 110 are defined with upstanding lips or ridges that are turned at a right angle mainly lips 112 and 114.

In the showing of FIG. 1, lip or ridge 114 has an interior portion removed therein providing a space, notch, or opening 120 that allows for placement of an item such as a spoon, serving utensil, or scoop 122. This space 120 or notch as previously set forth can be formed in any particular manner within the lid 30. However, it is believed that it is preferable in this particular case to place it in the corner for allowing the spoon, serving utensil, or scoop 122 to rest in the corner of the notch 110.

Figure 5:
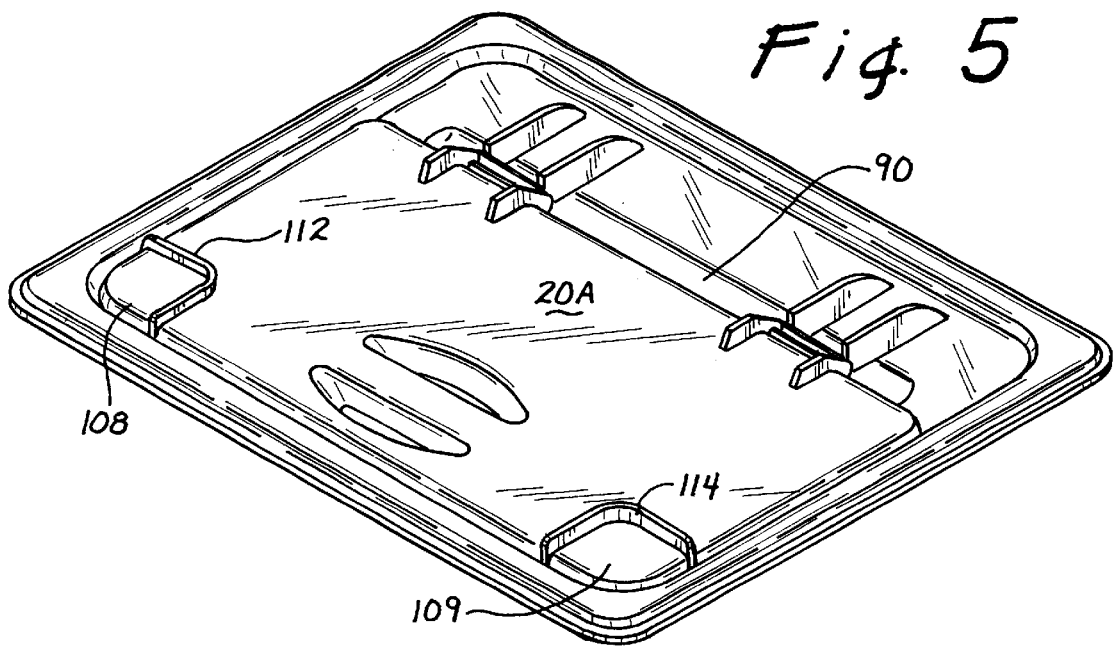
FIG. 5 shows a perspective view of the cover of this invention without the pan wherein the notched access opening has been eliminated.
Figure 6:
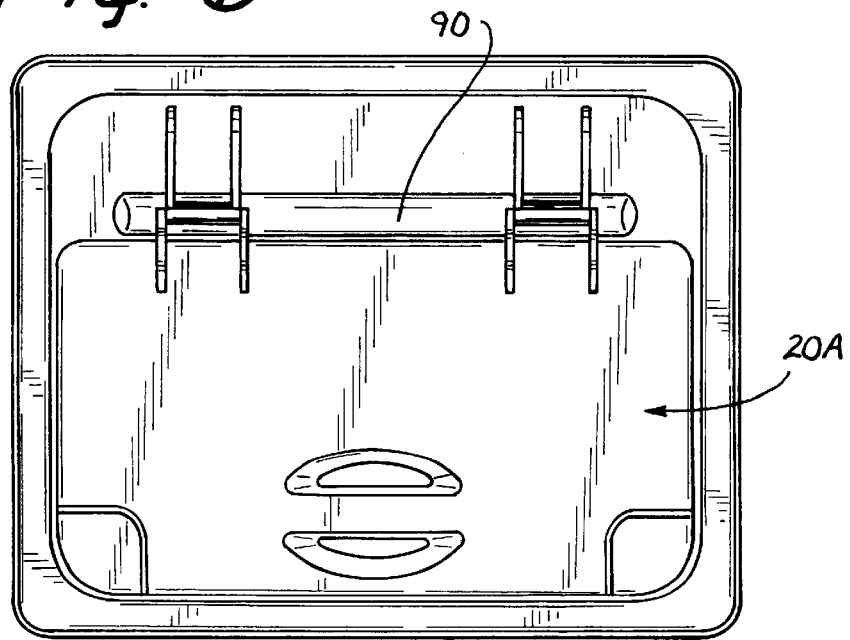
FIG. 6 shows a bottom plan view of the cover without the notch, as shown in FIG. 5.

Looking at FIGS. 5 and 6, it can be seen that areas 108 and 109 with the upright lips 112 and 114 have been provided in the form of a filled in web filling in the space 120 or notch 110. In all other respects, the showings of FIGS. 5 and 6 are identical in the form of the top lid 20 which has been designated 20a. In this manner, a complete closure of the top of the lid 20 can be undertaken by filling in the areas of the upright lips 112 and 114 of the pivotal lid 30. However, as previously stated all other elements can be the same in order to provide for the pivotal removal of lid 30 and cover 20 of the pan 10.

From the foregoing it can be seen that this invention is a significant step over the art to allow for an interior hinged lid within an exterior cover seated in a clean and readily accessible relationship to a pan as set forth herein.

What is claimed is:

1. A combination food pan and separately removable cover comprising:
    a pan having a base and upright side walls;
    a cover for removably seating on said upright side walls having an opening therein; said cover extending substantially around a periphery of said pan;
    a hinged lid separably molded from said cover mounted interiorly and spaced from the periphery of said cover for access to said pan through said opening; said cover and said lid being substantially rectangular
    a hinge pin interconnecting said hinged lid with said cover;
    an upwardly extending flange surrounding at least in part the opening on said cover;
    a downwardly extending flange surrounding at least in part the periphery of said hinged lid for seating over said flange surrounding the opening on said cover; and,
    an opening at a corner in said hinged lid to provide placement of a serving utensil therein.

2. The combination as claimed in claim 1 further comprising:
    a peripheral flange on the periphery of said cover that removably seats over and downwardly on the edge of said pan.

3. The combination as claimed in claim 1 further comprising:

an upstanding hinge stop on said cover or said lid to stop the hinged lid when in an open position.

4. The combination as claimed in claim 1 further comprising:

said cover having hinge clamps; and, said hinge pin is formed on said hinged lid for rotatably seating in said hinge clamps.

5. The combination as claimed in claim 3 further comprising:

a grip on said hinged lid for lifting said hinged lid.

6. A cover for a food service pan comprising:

a cover having a downwardly extending peripheral flange for removably seating over a pan, and having an interior opening within said cover; said cover extending substantially around a periphery of said pan when said cover is seated on said pan;

a lid hinged on a hinge pin interiorly and spaced from the periphery of said cover said lid overlaying said opening; said cover and said lid being substantially rectangular an upstanding flange on said cover interiorly thereof surrounding at least in part the opening of said cover;

a depending flange on said hinged lid for seating over said upstanding flange on said cover;

a grip on said hinged lid; and, an opening at a corner in said hinged lid for receiving a serving utensil.

7. The cover as claimed in claim 6 further comprising:

an upstanding hinge stop extending upwardly to check the movement of said lid and against which said lid can rest in the open position.

8. The cover as claimed in claim 6 wherein:

said hinged lid is hinged to said cover by said hinge pin mounted in a pair of hinge pin clamps.

9. A cover for a food service container comprising;

a removable cover having an opening interiorly and spaced from the periphery of said cover; said cover extending substantially around a periphery of said pan when said cover is seated on said pan;

a lid hinged by a hinge pin to said cover said lid overlaying said opening; said cover and said lid being substantially rectangular an upstanding flange on said cover at least partially surrounding said opening;

a depending flange at least partially surrounding said lid adapted to overlay said upstanding flange on said cover; and, an opening at a corner formed within said hinged lid for receiving a serving utensil.

10. The cover as claimed in claim 9 further comprising:

a depending flange on the periphery of said cover for seating over the edge of a food service container.

11. The cover as claimed in claim 9 further comprising:

means for opening said lid on said cover.

12. The cover as claimed in claim 9 further comprising:

an upright hinge stop extending above said hinge for said lid providing a stop and rest when said lid is in the opened hinged orientation.

13. The cover as claimed in claim 12 further comprising:

said lid is hinged with a hinge comprising hinge plates on said lid mounting said hinge pin and resilient hinge clamps are formed on said cover for resiliently receiving said hinge pin therebetween.

14. The cover as claimed in claim 9 further comprising:

a depressed recess within said cover having walls substantially oriented for seating within the interior walls of a food service container.

15. The combination as claimed in claim 1 further comprising:

a depressed recess on said cover formed with walls adapted to seat in the upper interior portions of the upright walls of said food pan.

\* \* \* \* \*